United States Patent
Nakamura et al.

(10) Patent No.: US 6,603,523 B2
(45) Date of Patent: Aug. 5, 2003

(54) LIQUID CRYSTAL DISPLAY DEVICE

(75) Inventors: Masako Nakamura, Yamatokoriyama (JP); Makoto Shiomi, Tenri (JP); Yoshito Hashimoto, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 09/941,985

(22) Filed: Aug. 30, 2001

(65) Prior Publication Data

US 2002/0080310 A1 Jun. 27, 2002

(30) Foreign Application Priority Data

Aug. 31, 2000 (JP) .................................. 2000-263947
Jun. 5, 2001 (JP) .................................. 2001-170343

(51) Int. Cl.$^7$ .......................................... G02F 1/1335
(52) U.S. Cl. .................. 349/119; 349/115; 349/105; 349/106; 349/113; 349/114; 349/118; 349/129; 349/117; 349/120
(58) Field of Search .................. 349/119, 118, 349/120, 129, 117, 115, 105, 106, 88, 113, 114

(56) References Cited

U.S. PATENT DOCUMENTS

| | | | | |
|---|---|---|---|---|
| 5,473,450 A | * | 12/1995 | Yamada et al. | 359/51 |
| 5,668,651 A | * | 9/1997 | Yamada et al. | 349/156 |
| 5,724,112 A | * | 3/1998 | Yoshida et al. | 349/117 |
| 6,097,458 A | * | 8/2000 | Tsuda et al. | 349/113 |
| 6,226,061 B1 | * | 5/2001 | Tagusa | 349/84 |
| 6,266,113 B1 | * | 7/2001 | Yamazaki et al. | 349/115 |
| 6,512,561 B1 | * | 1/2003 | Terashita et al. | 349/118 |

FOREIGN PATENT DOCUMENTS

| | | |
|---|---|---|
| JP | 5-107544 | 4/1993 |
| JP | 7-36058 | 2/1995 |
| JP | 8-43825 | 2/1996 |
| JP | 2000-66196 | 3/2000 |
| JP | 2000-330111 | 11/2000 |

OTHER PUBLICATIONS

Patent Abstracts of Japan of 5–107544; Abstract only.
Patent Abstracts of Japan of 7–36058; Abstract only.
Patent Abstracts of Japan of 8–43825; Abstract only.
Patent Abstracts of Japan of 2000–66196; Abstract only.
Patent Abstracts of Japan of 2000–330111; Abstract only.

* cited by examiner

*Primary Examiner*—Nathan J. Flynn
*Assistant Examiner*—Fazu Erdem
(74) *Attorney, Agent, or Firm*—Nixon & Vanderhye, P.C.

(57) ABSTRACT

A liquid crystal display device includes a pair of polarizing plates; a liquid crystal panel interposed between the pair of polarizing plates and including a liquid crystal layer having a pair of regions corresponding to each of pixels, alignment directions of liquid crystal molecules in the pair of regions being different by about 180 degrees from each other, the liquid crystal panel having a first slow axis; a first phase plate having a second slow axis which is horizontal to a surface thereof and perpendicular to the first slow axis; and a second phase plate having a third slow axis which is perpendicular to both of the first slow axis and the second slow axis. The liquid crystal material has a dependency of birefringence anisotropy ($\Delta n$) from 20° C. to 60° C. ([$\Delta n(20°$ C.)–$\Delta n(60°$ C.)]/40) of 0.00026 or less.

14 Claims, 8 Drawing Sheets

LIQUID CRYSTAL DISPLAY DEVICE

BACKGROUND OF THE INVENTION

1. Field of the Invention

The present invention relates to a liquid crystal display device of a normally black mode, and specifically to a liquid crystal display device preferably usable for displays requiring a wide viewing angle, such as TVs and monitors for personal computers including personal computers used for CAD. In this specification, the liquid crystal display device will be referred to as the "LCD device".

2. Description of the Related Art

As infrastructures for information technology are more and more developed, TVs, personal computer monitors, and other devices usable as a terminal for providing video and audio information are now required to be increasingly reduced in size. Especially, more and more devices such as small- or middle-sized TVs and personal computer monitors adopt LCD devices in order to meet the demands of society to save space and power.

For this purpose, twisted nematic mode LCD devices of an active driving system and super twisted nematic mode LCD devices of a passive driving system have been developed and widely used.

However, application of twisted nematic mode or super twisted nematic mode liquid crystal materials to a liquid crystal panel which is often used for a small- or middle-sized TV or a personal computer monitor, results in a smaller viewing angle. A liquid crystal panel having an unsatisfactorily small viewing angle has problems in that, for example, (i) one same color appears different at two ends of a screen and (ii) images appear differently from different viewing angles. For example, when a plurality of people watch the image, the image appears differently to each individual. The image also appears differently when the viewer sits up straight from when the viewer sits in a relaxed manner. Accordingly, the twisted nematic mode or super twisted nematic mode liquid crystal materials cannot be applied to a TV.

The twisted nematic mode or super twisted nematic mode liquid crystal materials have another problem in that the color tone changes area by area in a large screen. This problem prevents positive use of liquid crystal materials for personal computer monitors.

In order to solve these problems, LCD systems such as, for example, a multiple domain twisted nematic system (including a plurality of regions having different alignment directions of liquid crystal molecules) (Japanese Laid-Open Publication No. 5-107544), an ASM display system (Japanese Laid-Open Publication No. 6-301015), an MVA display system (Japanese Laid-Open Publication No. 8-43825), and an IPS display system (Japanese Laid-Open Publication No. 7-36058) have been proposed. However, none of these systems provides satisfactory display characteristics and involve the problem of higher cost.

The liquid crystal materials have birefringence anisotropy thereof change in accordance with the temperature, which involves an undesirable possibility of reducing the contrast of an image displayed by the LCD device.

SUMMARY OF THE INVENTION

A liquid crystal display device according to the present invention includes a pair of polarizing plates; a liquid crystal panel interposed between the pair of polarizing plates, the liquid crystal panel including a liquid crystal layer having liquid crystal molecules, the liquid crystal layer including a pair of regions corresponding to each of pixels, alignment directions of the liquid crystal molecules in the pair of regions being different by about 180 degrees from each other, the liquid crystal panel having a first slow axis; a first phase plate provided between the liquid crystal panel and one of the polarizing plates, the first phase plate having a second slow axis which is horizontal to a surface thereof and substantially perpendicular to the first slow axis of the liquid crystal panel; and a second phase plate provided between the liquid crystal panel and the one of the polarizing plates, the second phase plate having a third slow axis which is substantially perpendicular to both of the first slow axis of the liquid crystal panel and the second slow axis of the first phase plate. The liquid crystal material has a dependency of birefringence anisotropy ($\Delta n$) from 20° C. to 60° C. ($[\Delta n(20°$ C.$)-\Delta n(60°$ C.$)]/40$) of 0.00026 or less.

In one embodiment of the invention, the second phase plate further has a fourth slow axis which is parallel to a surface thereof.

In one embodiment of the invention, the first slow axis of the liquid crystal panel is at an angle of about 45 degrees with respect to a polarizing axes of the polarizing plates when no electric field is applied to the liquid crystal panel.

In one embodiment of the invention, the liquid crystal material has a dependency of birefringence anisotropy ($\Delta n$) on the temperature from 20° C. to 60° C. ($[\Delta n(20°$ C.$)-\Delta n(60°$ C.$)]/40$) of 0.00014 or more.

In one embodiment of the invention, the liquid crystal material has a dependency of birefringence anisotropy ($\Delta n$) on the temperature from 20° C. to 60° C. ($[\Delta n(20°$ C.$)-\Delta n(60°$ C.$)]/40$) of 0.0002 or more.

In one embodiment of the invention, the liquid crystal display device further includes a third phase plate having a fifth slow axis which is substantially perpendicular to the first slow axis of the liquid crystal panel and parallel to the second slow axis of the first phase plate; and a fourth phase plate having a sixth slow axis which is substantially perpendicular to both of the first slow axis of the liquid crystal and the fifth slow axis of the third phase plate. The third phase plate is provided between the liquid crystal panel and the other polarizing plate so as to be symmetrical to the first phase plate with respect to the liquid crystal panel, and the fourth phase plate is provided between the liquid crystal panel and the other polarizing plate so as to be symmetrical to the second phase plate with respect to the liquid crystal panel.

In one embodiment of the invention, the first phase plate and the third phase plate have a substantially equal birefringence to each other, and the second phase plate and the fourth phase plate have a substantially equal birefringence to each other.

Thus, the invention described herein makes possible the advantages of providing (1) a liquid crystal display device having a satisfactorily wide viewing angle at lower cost, and (2) a liquid crystal display device for alleviating the reduction of contrast of images despite a temperature change.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
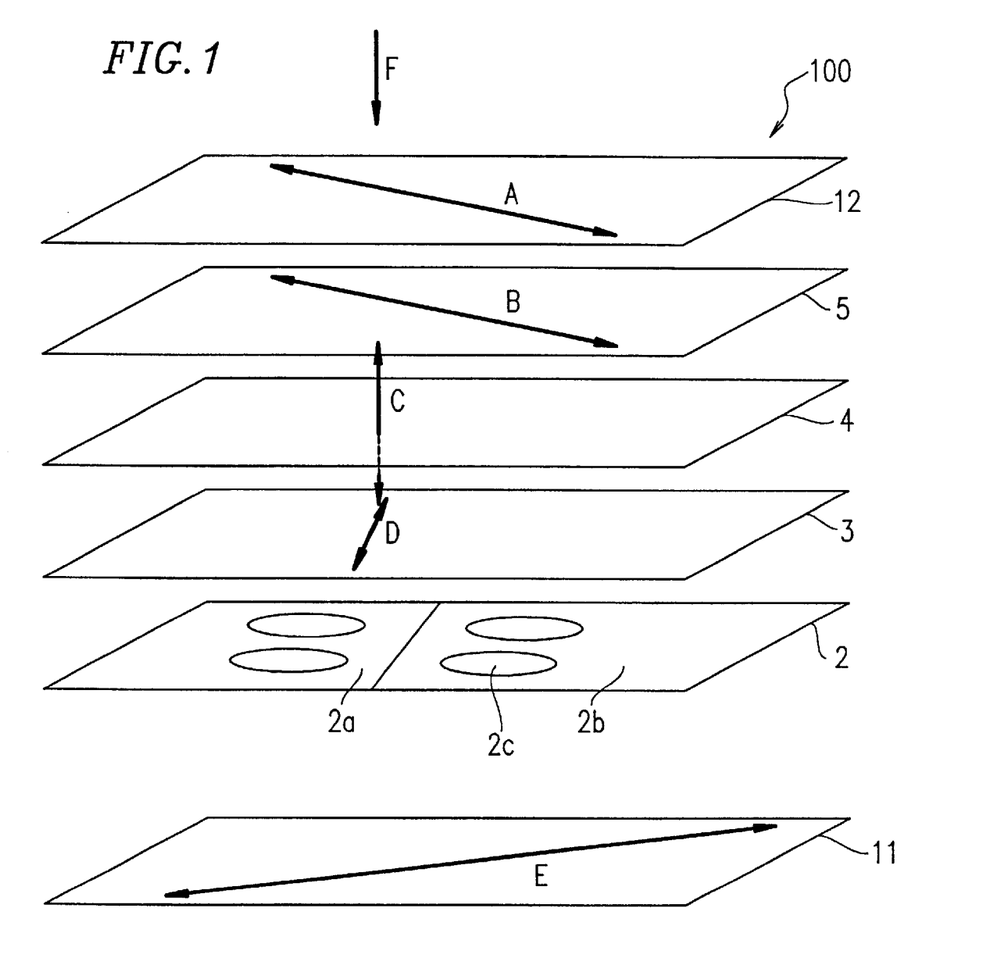
FIG. 1 is a schematic view of an LCD device according to one example of the present invention.

FIG. 1 is a schematic view illustrating a structure of an LCD device 100 according to one example of the present invention.

The LCD device 100 includes a liquid crystal panel 2, a horizontal phase plate (first phase plate) 3, a vertical phase plate (second phase plate) 4, and another horizontal phase plate 5, and a pair of polarizing plates 11 and 12 arranged in a crossed Nicols state. The liquid crystal panel 2, the horizontal phase plate 3, the vertical phase plate 4, and the horizontal phase plate 5 are arranged in a stacked manner in this order and interposed between the pair of polarizing plates 11 and 12. Arrows D, C and B shown with respect to the phase plates 3, 4 and 5 indicate the respective slow axis. Arrows E and A shown with respect to the polarizing plates 11 and 12 indicate the respective absorption axes (or polarizing axes).

The liquid crystal panel 2 is of a transmission type and includes a pair of transparent substrates and a liquid crystal layer (not shown) provided between the two substrates. The liquid crystal layer is obtained by injecting a nematic liquid crystal material into a gap between the substrates. The LCD device 100 is of a normally black mode, which provides black display when no electric field is applied thereto. In this state, liquid crystal molecules 2c are substantially parallel to the substrates.

One of the substrates includes quadrangular transparent pixel electrodes arranged in a matrix, and the other substrate includes a transparent counter electrode extending in substantially the entire surface thereof.

The liquid crystal layer includes pixel areas in correspondence with the pixel electrodes. Each pixel area includes a pair of alignment regions 2a and 2b. Between the alignment regions 2a and 2b, the alignment directions of the liquid crystal molecules 2c are different by about 180 degrees; that is, the liquid crystal molecules 2c are aligned substantially monoaxially as shown in FIG. 1 when seen from a front surface of the LCD device 100 (i.e., in the direction indicated by arrow F in FIG. 1). So long as the liquid crystal molecules 2c are aligned substantially monoaxially, the pretilt angle of the liquid crystal molecules 2c is not specifically limited.

When the alignment direction difference is shifted from 180 degrees by about 10 degrees or more, it is difficult to compensate for the birefringence of the liquid crystal layer by the phase plates 3, 4 and 5, which results in reduction in the contrast of images displayed by the LCD device 100. Therefore, the alignment direction difference between the alignment regions 2a and 2c is kept within the range of about 170 degrees to about 190 degrees. The alignment direction difference is most preferably 180 degrees, at which the liquid crystal molecules 2c are aligned monoaxially.

The alignment regions 2a and 2c having such an alignment direction difference can be formed using known techniques such as, for example, rubbing combined with tilt control by light, mask rubbing and alignment films.

The shape of the alignment regions 2a and b is not specifically limited. The alignment regions 2a and 2b preferably have areas having a ratio of 1:1, so that symmetrical viewing angle characteristics are obtained. The alignment regions 2a and 2b are preferably, for example, rectangular, which is realized by equally dividing one pixel area into two or four. Such a shape is obtained by a simple-patterned mask. Depending on the size of the liquid crystal panel 2, the alignment regions 2a and 2b can be provided respectively in correspondence with two adjacent pixel areas. In this case also, the alignment regions 2a and 2b can be obtained by a simple-patterned mask.

In this case, the alignment regions 2a and 2b are preferably arranged so as to form a checked or striped pattern throughout the liquid crystal panel 2, in order to realize uniform gray scale display.

The alignment axis of the liquid crystal molecules 2c is preferably at about 45 degrees with respect to the absorption axes E and A of the polarizing plates 11 and 12, for the following reason. The brightness of the LCD device 100 is represented by the difference in the birefringence anisotropy An between the state where the liquid crystal molecules 2c are substantially horizontal with respect to the substrates with no electric field applied and the state where the liquid crystal molecules 2c are raised by the application of an electric field. Therefore, it is most preferable that light is refracted by the liquid crystal layer such that the phase shift of the light is equal to a half of the wavelength. When the alignment axis of the liquid crystal molecules 2c is at 45 degrees with respect to the absorption axes E and A of the polarizing plates 11 and 12, the liquid crystal panel 2 can have a satisfactorily small thickness regardless of the birefringence anisotropy Δn, and thus can have a further improved viewing angle characteristic.

The liquid crystal molecules 2c rise by the application of the electric field in opposite directions in the alignment regions 2a and 2b as described later. Therefore, the gray scale display is prevented from being inverted.

The liquid crystal material used in the liquid crystal panel 2 has a relatively small birefringence anisotropy Δn even when the temperature changes. A specifically preferable liquid crystal material has a birefringence anisotropy Δn of 0.00026 or less when the temperature changes from 20° C. to 60° C. ([Δn(20° C.)−Δn(60° C.)]/40≦0.00026) for the reason described later. Use of such a liquid crystal material prevents the contrast of the images from being reduced.

As shown in FIG. 1, the horizontal phase plate 3 has a slow axis (arrow D; second slow axis) which is horizontal or parallel with respect to a surface thereof. The horizontal phase plate 3 has a substantially equal size or magnitude of retardation to that of the liquid crystal panel 2, and is provided so that the retardation axis D is substantially perpendicular to the alignment axis of the liquid crystal molecules 2c in the liquid crystal panel 2. The liquid crystal panel 2 acts as a substantially monoaxial phase plate when no electric field is applied. In other words, the alignment axis of the liquid crystal molecules 2c in the liquid crystal panel 2 acts as a slow axis (first slow axis). By the combination of the liquid crystal panel 2 and the horizontal phase plate 3, the retardation of an image displayed by the LCD device 100 when seen from the front surface of the LCD device 100 can be compensated for. As a result, when no electric field is applied, the LCD device 100 of the normally black mode provides a satisfactorily high level of contrast.

The horizontal phase plate 3 can be provided between the liquid crystal panel 2 and the polarizing plate 11.

The vertical phase plate 4 has a slow axis C (third slow axis) which is vertical or perpendicular to a surface thereof. The slow axis C is also perpendicular to the slow axis of the liquid crystal panel 2 and to the slow axis D of the horizontal phase plate 3.

When an image of the LCD device 100 is viewed at a relatively large angle with respect to the direction normal to the front surface of the LCD device 100, birefringence which is not compensated for by the horizontal phase plate 3 occurs. The vertical phase plate 4 compensates for such birefringence and provides a satisfactory normally black display.

The polarizing plates 11 and 12 generally include a TAC (time-to-amplitude converter) layer having birefringence anisotropy in a vertical direction. In such a case, the optimum retardation magnitude of the vertical phase plate 4 is changed. In the case where the vertical phase plate 4 is formed of a drawing process, a slight phase shift may be generated in the vertical phase plate 4 in a horizontal direction. Such a phase shift can be compensated for by providing another appropriate horizontal phase plate. The transmittance of the LCD device 100 can be prevented from decreasing by matching the slow axis of the additional horizontal phase plate 4 with the polarizing axis.

The horizontal phase plate 5 has the slow axis B which is substantially parallel to the polarizing axis A of the polarizing plate 12. When an image displayed by the LCD device 100 is viewed at a relatively large angle with respect to the direction normal to the front surface of the LCD device 100 so as to change the azimuth, light leakage is observed due to a change in the apparent angle of the polarizing plate 12. In order to prevent the light leakage, the horizontal phase plate 5 having the slow axis B is provided. When the compensation for the retardation provided by the combination of the liquid crystal panel 2 and the horizontal phase plate 3 is complete (i.e., when the magnitude of retardation caused when an image is viewed in the direction normal to the front surface of the LCD device 100 is 0), the slow axis B of the horizontal phase plate 5 preferably matches the absorption axis A of the polarizing plate 12 in order to provide a high level of contrast. The slow axis B and the absorption axis A can be shifted to each other at an angle in the range of −2 degrees to +2 degrees.

The horizontal phase plate 5 can be provided between the liquid crystal panel 3 and the vertical phase plate 4.

The vertical phase plate 4 is preferably formed of a material which is generally used for a vertical phase plate, for example, polycarbonate, in terms of the processing technology and the cost of the material. In the case where the vertical phase plate 4 is formed a drawing process, retardation is unavoidably generated in the plane thereof. Such retardation can be compensated for by providing another phase plate, but such a technique requires an additional step of combining the phase plate and increases the production cost of the LCD device 100. By arranging the vertical phase plate 4 so that the slow axis of the retardation in the plane of the vertical phase plate 4 is substantially parallel to the absorption axis of the polarizing plate 12, the vertical phase plate 4 can also have the function of the horizontal phase plate 5. Such a structure is shown in FIG. 2.

Figure 2:
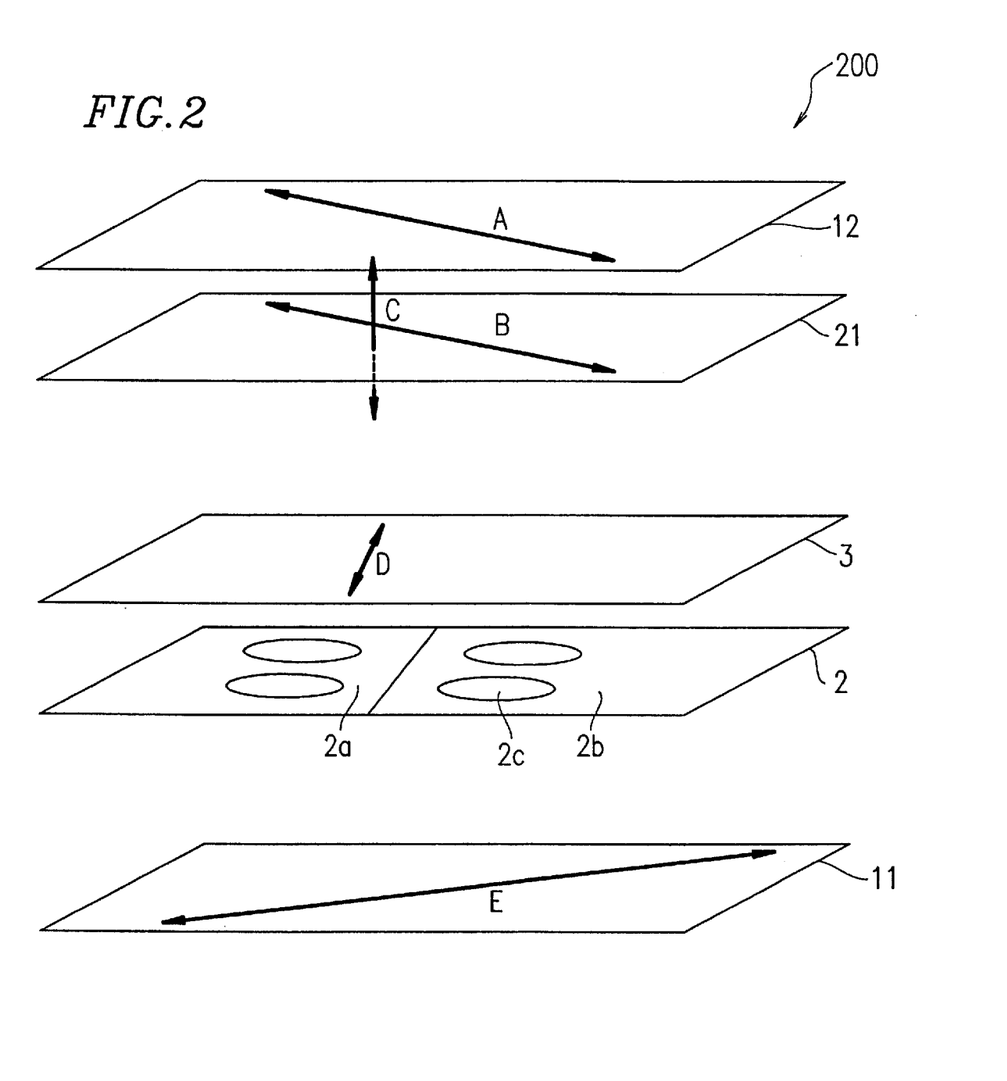
FIG. 2 is a schematic view of an LCD device according to another example of the present invention.

FIG. 2 is a schematic view illustrating a structure of an LCD device 200 according to another example of the present invention. Identical elements described with respect to FIG. 1 bear identical reference numerals therewith and will not be described in detail.

The LCD device 200 includes a liquid crystal panel 2, a horizontal phase plate 3, a biaxial phase plate 21, and a pair of polarizing plates 11 and 12. The liquid crystal panel 2, the horizontal phase plate 3, and the biaxial phase plate 21 are provided in a stacking manner in this order and interposed between the polarizing plates 11 and 12.

The biaxial phase plate 21 corresponds to the above-mentioned vertical phase plate also having the function of the horizontal phase plate, and has the horizontal slow axis B (fourth slow axis) and the vertical slow axis C (third slow axis). The combination of the slow axis of the liquid crystal panel 2 and the slow axis D of the horizontal phase plate 3 compensates for the retardation which is caused when an image is viewed in the direction normal to the front surface of the LCD device 200.

The combination of the slow axis D of the horizontal phase plate 3 and the slow axis C of the biaxial phase plate 21 compensates for the retardation caused when an image is viewed at an angle with respect to the direction normal to the front surface of the LCD device 200.

In this case also, the slow axis B and the polarizing axis A can be shifted to each other at an angle in the range of −2 degrees to +2 degrees. The slow axis B and the polarizing axis A preferably match each other when the compensation for the retardation provided by the combination of the slow axis of the liquid crystal panel 2 and the slow axis D of the horizontal phase plate 3 is complete.

Figure 3:
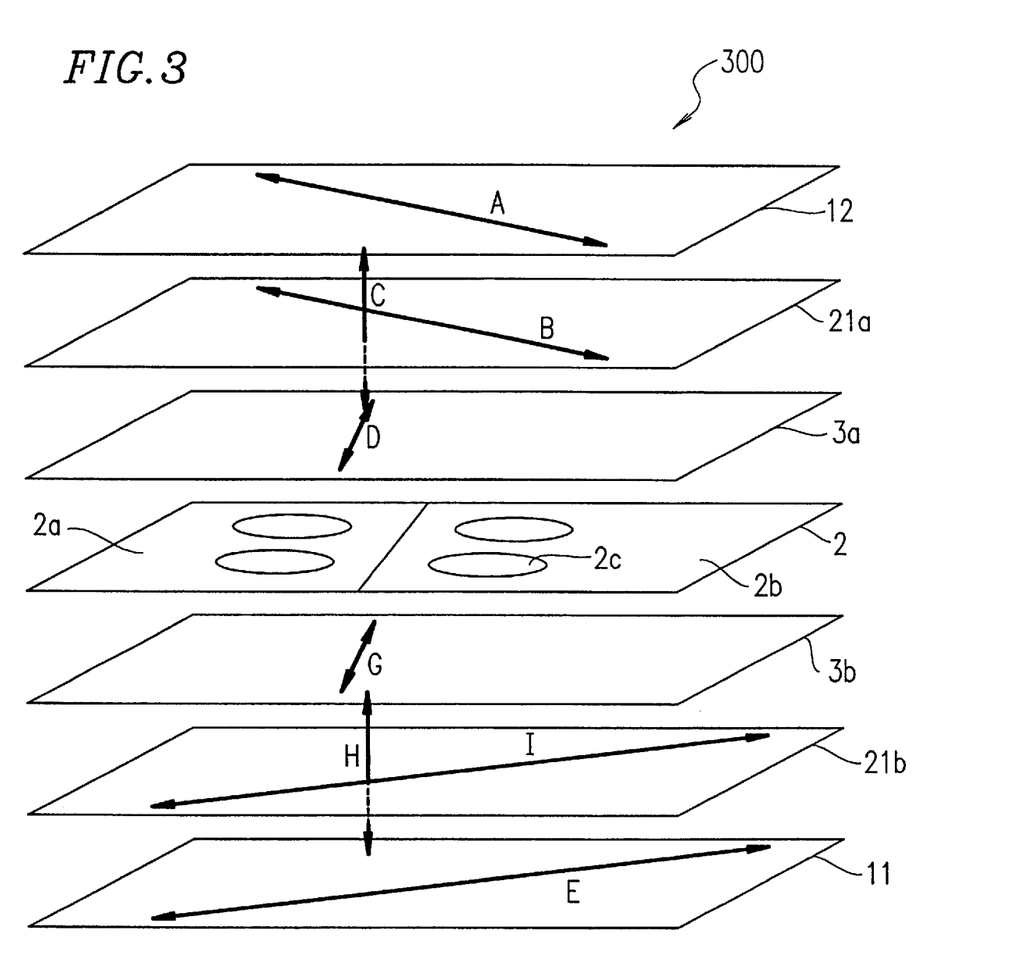
FIG. 3 is a schematic view of another LCD device according to still another example of the present invention.

FIG. 3 is a schematic view illustrating a structure of an LCD device 300 according to still another example of the present invention. Identical elements described with respect to FIG. 1 bear identical reference numerals therewith and will not be described in detail.

In the case where the birefringence or the retardation caused by the birefringence, whether a horizontal component or a vertical component, caused by the liquid crystal panel 2 is too large to be completely compensated for with one phase plate having a horizontal slow axis or a vertical slow axis, inconveniences in terms of production occur even when the retardation is substantially completely compensated for. The LCD device 300 has a structure for solving such an inconvenience.

As shown in FIG. 3, the LCD device 300 includes a liquid crystal panel 2, a horizontal phase plate 3a, a biaxial phase plate 21a, and a polarizing plate 12. The horizontal phase plate 3a and the biaxial phase plate 21a are interposed between the liquid crystal panel 2 and the polarizing plate 12. The LCD device 300 further includes another horizontal phase plate 3b (third phase plate), another biaxial phase plate 21b (fourth phase plate), and a polarizing plate 11. The horizontal phase plate 3b and the biaxial phase plate 21b are interposed between the liquid crystal panel 2 and the polarizing plate 11. The horizontal phase plates 3a and 3b respectively have slow axes D and G (second slow axis and fifth slow axis) which are parallel to surfaces thereof. The biaxial phase plate 21a has a horizontal slow axis B (fourth slow axis) and a vertical slow axis C (third slow axis). The biaxial phase plate 21b has a vertical slow axis H (sixth slow axis) and a horizontal slow axis I (seventh slow axis).

The horizontal phase plates 3a and 3b together compensate for the retardation caused when an image of the LCD device 300 is viewed in the direction normal to the front surface of the LCD device 300. The biaxial phase plates 21a and 21b together compensate for the retardation caused when an image of the LCD device 300 is viewed at an angle with respect to the direction normal to the front surface of the LCD device 300.

In terms of the function, it is sufficient so long as the horizontal phase plates 3a and 3b each provide a phase shift so that the combination thereof provides a desired amount of phase shift. In order to mass-produce the horizontal phase plates 3a and 3b in an equal amount, it is preferable that the horizontal phase plates 3a and 3b each provide about a half of the desired amount of phase shift. Similarly, it is preferable that the biaxial phase plates 21a and 21b each provide about a half of the desired amount of phase shift in order to mass-produce the biaxial phase plates 21a and 21b in an equal amount.

Each of the biaxial phase plates 21a and 21b can be replaced with one horizontal phase plate and one vertical phase plate as shown in FIG. 1.

Optimum combinations of various properties of the liquid crystal panel 2, the horizontal phase plates 3a and 3b, the biaxial phase plates 21a and 21b, and the polarizing plates 11 and 12 are defined by a desired level of contrast and desired viewing angle characteristics. Especially preferable combinations are shown in Table 1.

TABLE 1

| Liquid crystal panel | | 3a,3b | | 21a | | | 21b | | | 11 | 12 |
|---|---|---|---|---|---|---|---|---|---|---|---|
| dΔn | θ | θ | dΔn | d(nx − xy) | θ | d(nx − xz) | d(nx − xy) | θ | d(nx − xz) | θ | θ |
| 260 | 45 | 130 | 135 | 90 | 0 | 95 | 90 | 90 | 95 | 0 | 90 |
| 262 | 45 | 135 | 135 | 86 | 0 | 105 | 86 | 92 | 105 | 0 | 90 |
| 264 | 45 | 135 | 135 | 86 | 0 | 105 | 86 | 91 | 105 | 0 | 90 |
| 255 | 45 | 130 | 135 | 90 | 0 | 95 | 90 | 91 | 95 | 0 | 90 |
| 265 | 45 | 135 | 135 | 86 | 0 | 105 | 86 | 91 | 105 | 0 | 90 |
| 257 | 45 | 130 | 135 | 90 | 0 | 95 | 90 | 91 | 95 | 0 | 90 |
| 263 | 45 | 130 | 135 | 90 | 0 | 95 | 90 | 89 | 95 | 0 | 90 |
| 264 | 45 | 130 | 135 | 90 | 0 | 95 | 90 | 89 | 95 | 0 | 90 |
| 255 | 45 | 125 | 135 | 94 | 0 | 87 | 94 | 89 | 87 | 0 | 90 |
| 265 | 45 | 130 | 135 | 90 | 0 | 95 | 90 | 89 | 95 | 0 | 90 |
| 258 | 45 | 125 | 135 | 94 | 0 | 87 | 94 | 89 | 87 | 0 | 90 |

Figure 7A:
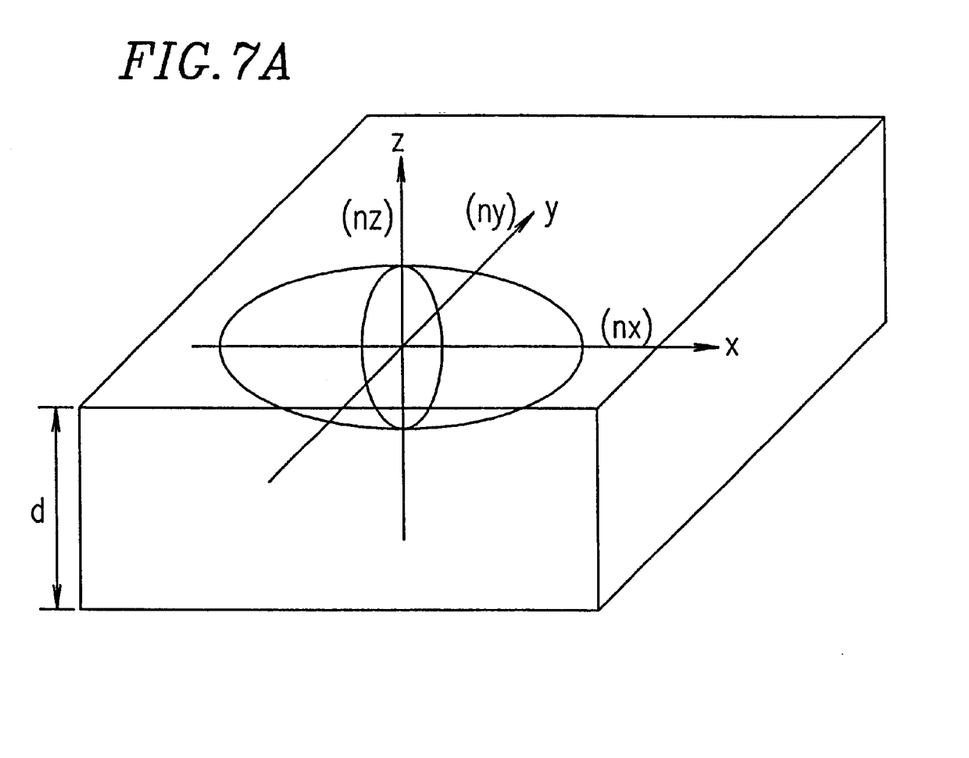
FIGS. 7A and 7B illustrate parameters of Table 1.
Figure 7B:
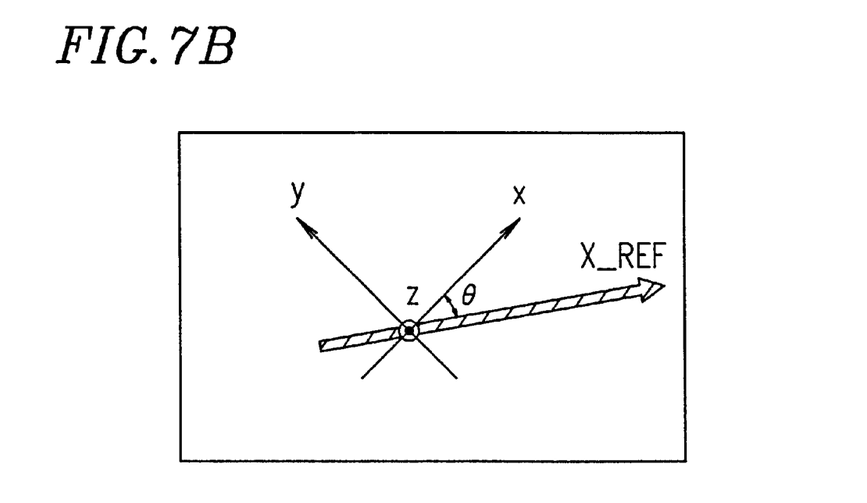

FIGS. 7A and 7B illustrate the parameters in Table 1. As shown in FIG. 7A, x, y and z directions are perpendicular to each other. In Table 1, nx, ny and nz are respectively refractive indices in the x, y and z directions. Referring to FIG. 7B, azimuth θ regarding the liquid crystal panel 2 in Table 1 represents the rubbing direction. Azimuth θ regarding the horizontal phase plates 3a and 3b represents the angle of the slow axis of each of the horizontal phase plates 3a and 3b with respect to the x direction. Azimuth θ regarding the biaxial phase plates 21a and 21b represents the angle of the slow axis of each of the biaxial phase plates 21a and 21b with respect to the x direction. Azimuth θ regarding the polarizing plates 11 and 12 represents the angle of the absorption axis of each of the polarizing plates 11 and 12 with respect to the x direction. The retardation is represented by d•(nx−ny) and d•(nx−nz), where letter d indicates the thickness of the liquid crystal layer.

The angle of the absorption axes of the polarizing plates 11 and 12 shown in Table 1 is provided in consideration of the retardation of the TAC layer (about −50 nm in the vertical direction) of a generally used polarizing plate. A difference in the retardation magnitude of the TAC layer results in a corresponding difference in the retardation magnitude of the polarizing plate 11 or 12.

The combinations shown in Table 1 prevents undesirable phenomena such as, for example, reduction in the level of contrast of an image viewed in the direction normal to the front surface of the LCD device 300 (hereinafter, referred to as the "contrast level in the normal direction") and also of an image viewed at an angle with respect to the direction normal to the front surface of the LCD device 300, and inversion of gray scale display.

Table 1 refers to the LCD device 300 shown in FIG. 3, but can also be appropriately applied to the LCD device 100 shown in FIG. 1 and the LCD device 200 shown in FIG. 2.

A LCD device according to the present invention having the above-described structure has a satisfactorily wide viewing angle, does not cause inversion of the gray scale display when actively driven, and has a high response speed. Such an LCD device is optimum to a TV or a large-screen computer monitor.

(EXAMPLE)

Figure 4:
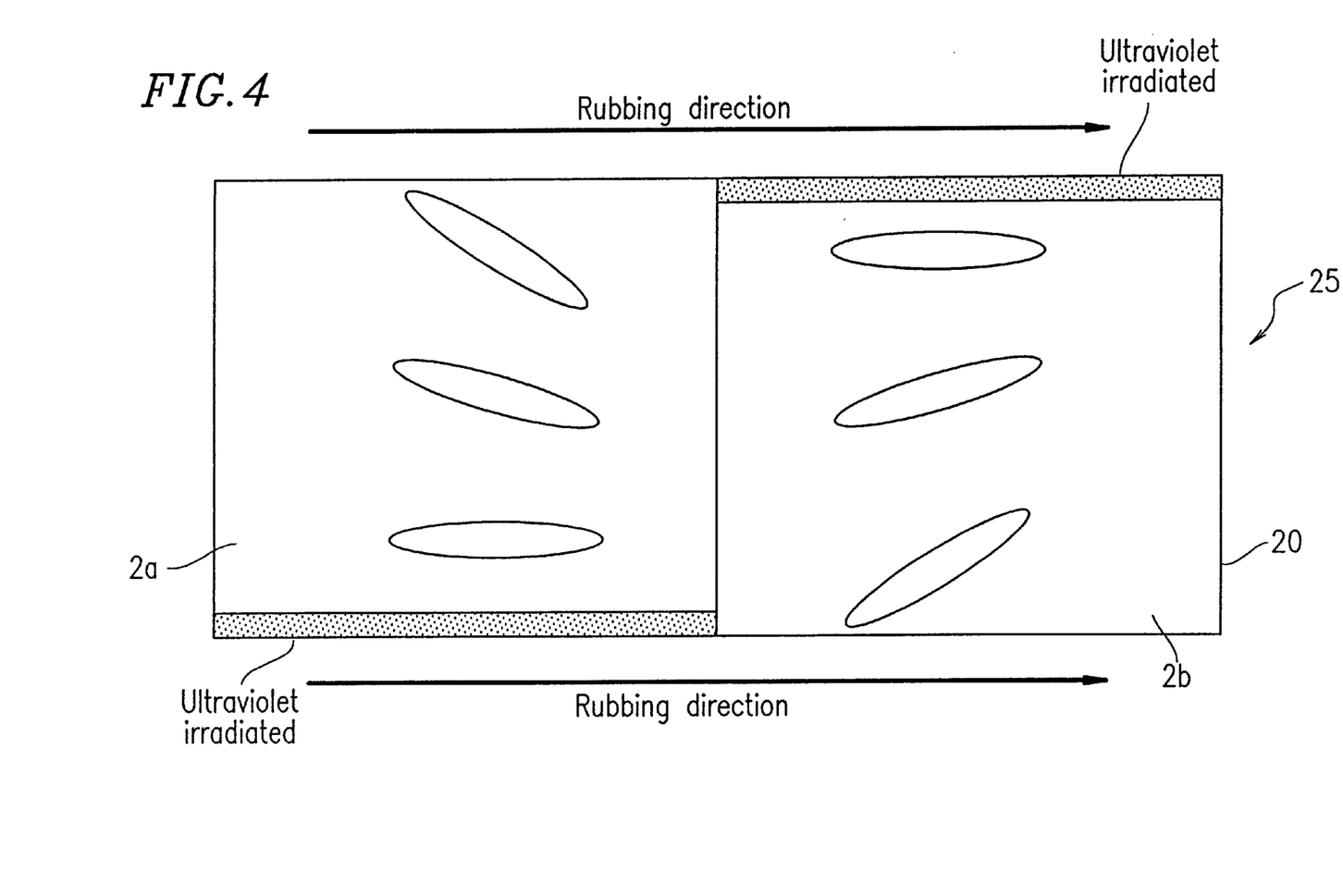
FIG. 4 is a schematic cross-sectional view of a liquid crystal panel according to a specific example of the present invention.

Hereinafter, a specific example according to the present invention will be described. FIG. 4 is a schematic cross-sectional view of a liquid crystal panel 25 according to the specific example.

The liquid crystal panel 25 is produced in the following manner.

TFTs, an insulating layer, and pixel electrodes are formed on a transparent glass plate by a known technique. A polyimide-based alignment layer is formed on the resultant substrate. A counter electrode is formed on a counter plate (color filter plate), and a polyimide-based alignment layer is formed on the resultant substrate. Each of the substrates has a size of 18 inches.

Each of the substrates is irradiated with deep ultraviolet, and then rubbed with a rayon-based cloth so that the two substrates have the same rubbing direction. The two substrates are combined together with a gap of about 4.3 μm. A liquid crystal material having a birefringence anisotropy Δn of 0.060 (at 20° C.) is injected into the gap between the substrates so as to form a liquid crystal layer 20. Thus, the liquid crystal panel 25 is produced. The retardation magnitude Δn•d of the liquid crystal layer 20, which is measured at 20° C., is 260 nm.

FIG. 4 shows one pixel area including a pair of alignment regions 2a and 2b in the liquid crystal layer 20. The above-mentioned deep ultraviolet is directed to an area of one of the substrates corresponding to the alignment region 2a, and is directed to an area of the other substrate corresponding to the alignment region 2b. As shown in FIG. 4, the liquid crystal molecules 2c in the vicinity of the substrate irradiated with the deep ultraviolet have a pretilt angle of almost 0 degrees, whereas the liquid crystal molecules 2c in the vicinity of the substrate not irradiated with the deep ultraviolet have a pretilt angle of about 4 degrees. In this manner, the tilt directions of the liquid crystal molecules 2c in the alignment regions 2a and 2b are opposite from each other when the liquid crystal layer 20 is supplied with an electric field.

Figure 5:
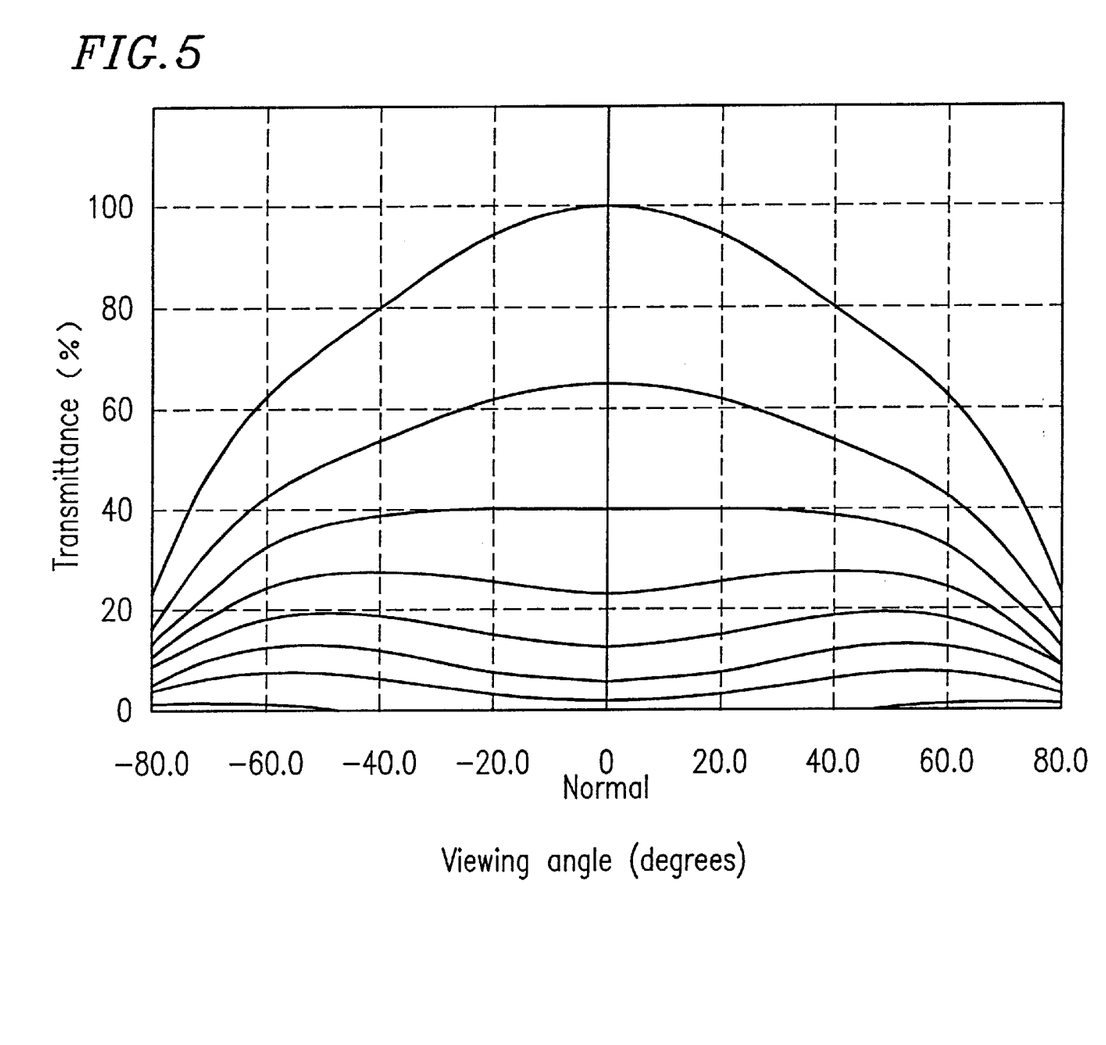
FIG. 5 is a graph illustrating the transmittance of LCD devices according to the present invention with respect to the viewing angle.

Liquid crystal display devices having a structure shown in FIG. 3 were produced using the liquid crystal panel 25 shown in FIG. 4. Table 2 shows the retardation magnitude of each of the phase plates. The response speed of the LCD devices was about 25 msec. The viewing angle characteristics of the LCD devices at 20° C. were measured. The results were satisfactory as shown in FIG. 5. The contrast level in the normal direction of these LCD devices was also as high as 250.

TABLE 2

| | Retardation of the liquid crystal panel | Retardation of the first or third phase plate (either one) | Retardation of the second and fourth phase plate in the horizontal direction (total) | Retardation of the second and fourth phase plate in the vertical direction (total) |
| --- | --- | --- | --- | --- |
| ① | 260 | 130 | 184 | −190 |
| ② | 260 | 130 | 187 | −204 |
| ③ | 260 | 130 | 190 | −218 |
| ④ | 260 | 130 | 199 | −188 |
| ⑤ | 260 | 130 | 202 | −202 |
| ⑥ | 260 | 130 | 214 | −186 |
| | | | | (nm) |

Table 3 shows the retardation magnitude at different temperatures and the dependency of the birefringence anisotropy on the temperature of various liquid crystal materials LC2 through LC5 encompassed by the present invention. LC1 indicates a liquid crystal material in a comparative example. Liquid crystal material LC2 is used for the liquid crystal panel 25. The dependency of the birefringence anisotropy on the temperature of the liquid crystal material LC2 is [Δn(20° C.)−Δn(60° C.)]/40= 0.00025, which is relatively small. In the case where the liquid crystal material LC2 has a retardation magnitude Δn•d of 260 nm at 20° C., the liquid crystal material LC2 has a retardation magnitude Δn•d of 215 nm at 60° C.

TABLE 3

| | | Δn | | | |
|---|---|---|---|---|---|
| | | Δn(20° C.) | Δn(60° C.) | Δn(20° C.–60° C.) | Δn(20° C.–60° C.)/40 |
| Comparative example | LC1 | 0.055 | 0.038 | 0.017 | 0.000425 |
| Examples | LC2 | 0.060 | 0.050 | 0.010 | 0.00025 |
| | LC3 | 0.060 | 0.052 | 0.008 | 0.00020 |
| | LC4 | 0.063 | 0.056 | 0.007 | 0.000175 |
| | LC5 | 0.065 | 0.058 | 0.007 | 0.000175 |

Figure 6:
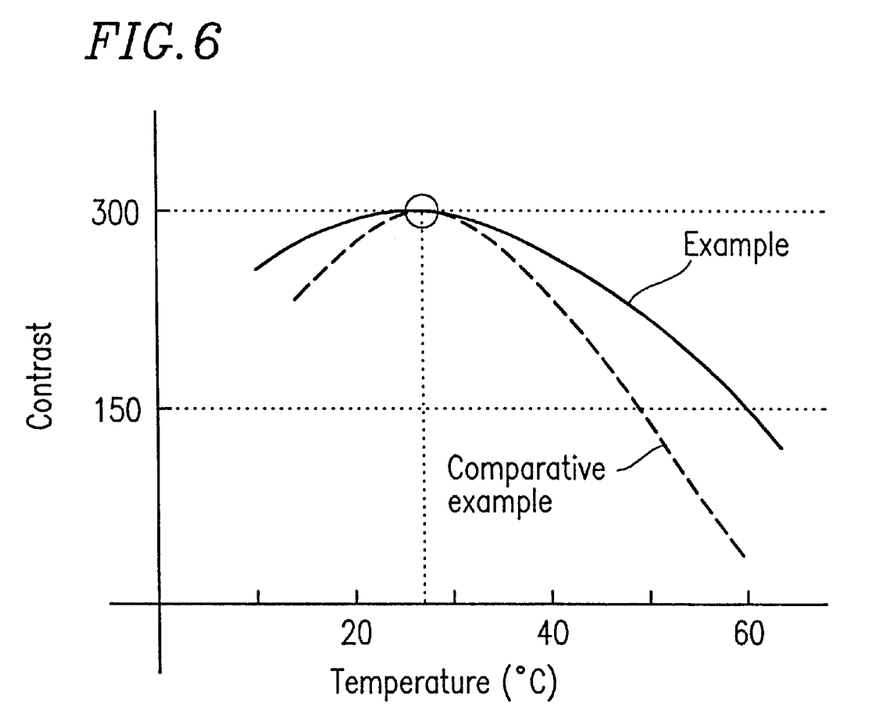
FIG. 6 is a graph illustrating the contrast with respect to the temperature of an LCD device according to the present invention and an LCD device in a comparative example.

FIG. 6 shows the contrast level in the normal direction of an LCD device according to the present invention and an LCD device in a comparative example, as the temperature changes from 20° C. to 60° C.

In the case of the LCD device according to the present invention, the contrast level in the normal direction is at least 50% of the optimum value (300 in FIG. 6) (i.e., at least 150) while the temperature changes within the range of +30° C. from the temperature at which the optimum value of 300 is obtained (i.e., 30° C.). In an LCD device having a retardation magnitude of 210 nm or more, at least 50% of the optimum value can be maintained regardless of the temperature.

Liquid crystal materials LC3 through LC5 shown in Table 3 were each used for forming a liquid crystal panel, and the contrast level in the normal direction thereof was measured while the temperature was changed from 20° C. to 60° C. In all the liquid crystal panels, the contrast level of 150 or more was maintained.

For comparison, a liquid crystal material LC1 shown in Table 3 was used for forming a liquid crystal panel, and the contrast level in the normal direction thereof was measured. As shown in FIG. 6, the contrast level in the normal direction was less than 100 at 60° C.

As described above, according to the present invention, a liquid crystal material having a low dependency of the birefringence anisotropy Δn on the temperature, especially a liquid crystal material having such a dependency of 0.00026 or less between the temperature of 20° C. to 60° C. is used. A LCD device using such a liquid crystal material prevents the contrast level from decreasing due to the temperature change in the use environment and provides a high response speed and satisfactory viewing angle characteristics. Such an LCD device maintains the contrast level in the normal direction of 150 or more in most of the temperature range in which the device is used.

Hereinafter, the relationship between the dependency of the birefringence anisotropy Δn on the temperature from 20° C. to 60° C., [Δn(20° C.)–Δn(60° C.)]/40, and the contrast level in the normal direction will be described.

Figure 8:
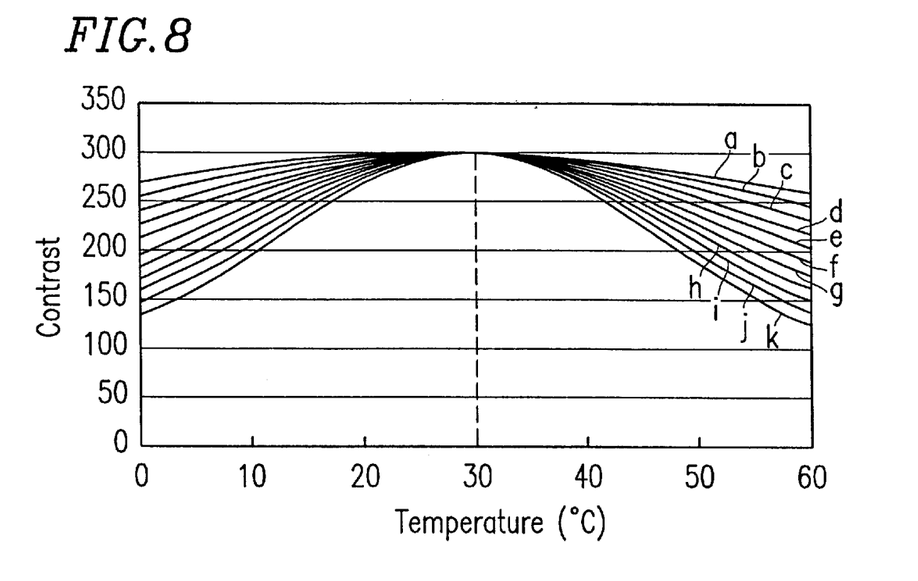
FIG. 8 is a graph illustrating the contrast with respect to the temperature of the LCD devices according to the present invention and in comparative examples shown in Table 4.
Figure 9:
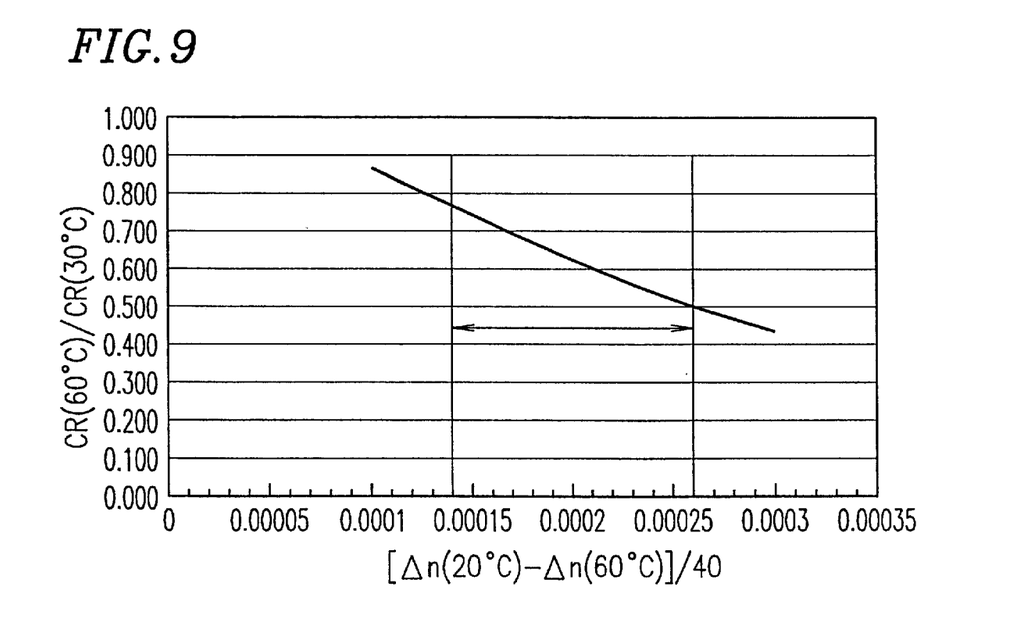
FIG. 9 is a graph illustrating the relationship between the dependency of the birefringence anisotropy on the temperature and the ratio of the contrast at 60° C. to the contrast at 30° C. of the LCD devices according to the present invention and in comparative examples shown in Table 4.

Table 4 shows characteristics of liquid crystal materials in comparative examples a and b, examples c through i and comparative examples j and k. The comparative examples a, b, j and k and the examples c through i have different levels of dependency of the birefringence anisotropy Δn on the temperature. In Table 4, [Δn(20° C.)–Δn(60° C.)]/40 indicates the above-mentioned level of dependency from 20° C. to 60° C., and CR60/30 indicates the ratio of the contrast level in the normal direction at 60° C. with respect to the contrast level in the normal direction at 30° C. In the temperature range of 20° C. to 60° C., the contrast level in the normal direction is minimum at 60° C. and is optimum at 30° C. FIG. 8 shows the contrast level in the normal direction obtained by the LCD devices using the liquid crystal materials in comparative examples a, b, j and k and examples c through i, with respect to the temperature.

TABLE 4

| | | Δn(20–60)/40 | CR60/30 |
|---|---|---|---|
| Comparative example | a | 0.0001 | 0.863 |
| Comparative example | b | 0.00012 | 0.817 |
| Example | c | 0.00014 | 0.768 |
| Example | d | 0.00016 | 0.719 |
| Example | e | 0.00018 | 0.671 |
| Example | f | 0.0002 | 0.625 |
| Example | g | 0.00022 | 0.580 |
| Example | h | 0.00024 | 0.539 |
| Example | i | 0.00026 | 0.500 |
| Comparative example | j | 0.00028 | 0.464 |
| Comparative example | k | 0.0003 | 0.430 |

As can be appreciated from FIG. 8 and Table 4, the LCD devices using the liquid crystal materials having [Δn(20° C.)–Δn(60° C.)]/40 of 0.00026 or less (comparative examples a and b and examples c through i) exhibit a relatively small change in the contrast level in accordance with the temperature change in the use environment. These LCD devices provide satisfactory viewing angle characteristics and CR60/30 of 0.5 or more. These LCD devices also exhibit a sufficiently high response speed.

In addition, as [Δn(20° C.)–Δn(60° C.)]/40 decreases, the change in the contrast level in the normal direction in accordance with the temperature change from 20° C. to 60° C. is reduced. Therefore, [Δn(20° C.)–Δn(60° C.)]/40 is preferably as small as possible.

However, when [Δn(20° C.)–Δn(60° C.)]40 is excessively small, the mesomorphic temperature range in which the nematic liquid crystal molecules can be driven, which changes in accordance with the alignment order of the liquid crystal molecules, increases. As a result, phenomena undesirable in practical use such as, for example, crystallization of the liquid crystal molecules at a low temperature and increase in the viscosity thereof may possibly occur.

Actually, the above-mentioned phenomena occurred with the liquid crystal materials in comparative examples a and b (Table 4). As a result, the image blurred. No such phenomena occurred with the liquid crystal materials in examples c through i and comparative examples j and k.

Therefore, [Δn(20° C.)–Δn(60° C.)]/40 is preferably in the range of 0.00014 to 0.00026.

In the case where a sufficiently high response speed is required, [Δn(20° C.)−Δn(60° C.)]/40 is preferably 0.0002 or more in consideration of the viscosity of the liquid crystal materials at 20° C. or higher.

Accordingly, in order to provide both a sufficiently high level of contrast in the normal direction and a sufficiently high response speed, [Δn(20° C.)−Δn(60° C.)]/40 is preferably in the range of 0.0002 to 0.00026.

In the above description, the lowest contrast level is set to be ½ or more of the optimum contrast level in order to determine a preferable range of temperatures. This value is based on the phenomenon that display nonuniformity, which appears on the screen due to the temperature nonuniformity in the display area caused by backlight, becomes visually conspicuous when the lowest contrast level is reduced to a half of the optimum contrast level.

This standard is applicable to various types of LCD devices as described below.

For example, in the case of TVs, brightness is generally most important and a white luminance of 450 cd/cm² or more is required. Even when the white luminance is 450 cd/cm², the luminance recognized as black display is generally considered to be less than 3 cd/cm². When the white luminance is 450 cd/cm² and the contrast level is 300 at room temperature, for example, the black luminance is 1.5 cd/cm². When the black luminance at 60° C. is 2 cd/cm², a change of the constant level from 450/1.5=300 (at room temperature) to 450/2=225 (60° C.) is tolerable. In this case, [Δn(20° C.)−Δn(60° C.)]/40 is 0.00026 or less.

In a device which is not required to have an especially high level of brightness, such as, for example, a notebook computer, the white luminance is generally considered to be 150 cd/cm². The black luminance at 30° C. is 0.5 cd/cm². When the black luminance at 60° C. is 2 cd/cm², a change of the constant level from 150/0.5=300(30° C.) to 150/2=75(60° C.) is tolerable. Since 75/300=0.25, the standard of 0.5 is well within the tolerable range.

The tolerable range of the dependency of the birefringence anisotropy Δn on the temperature varies in accordance with the use of the liquid crystal material. The present invention is applicable to these uses with the standard that the lowest contrast level is ½ or more of the optimum contrast level.

In a liquid crystal display device of a vertically aligned mode according to the present invention, the dependency of the contrast level on the temperature is larger than in a liquid crystal mode in which the residual retardation at the interface in the black display is compensated for by the liquid crystal material itself (for example, a twisted nematic mode). Therefore, the above numerical range of the-dependency of the birefringence anisotropy of a liquid crystal material on the temperature is specifically effective for the liquid crystal display device of a vertically aligned mode.

As described above, according to the present invention, a horizontal phase plate having a slow axis, which is horizontal to a surface thereof and substantially perpendicular to the slow axis of the liquid crystal panel, and a vertical phase plate having a slow axis, which is substantially perpendicular both to the slow axis of the liquid crystal panel and the slow axis of the horizontal phase plate, are provided between the polarizing plate and the liquid crystal panel. Therefore, a liquid crystal display device according to the present invention exhibits wide viewing angle characteristics, and avoids inversion of gray scale display and provides a satisfactorily high response speed when actively driven. Such a liquid crystal display device is preferable for TVs and large screen personal computer monitors.

The liquid crystal display device according to the present invention also uses a liquid crystal material having a dependency level of birefringence anisotropy Δn on the temperature of 0.00026 or less. Such a liquid crystal display device maintains the high contrast level even when the temperature at which the device is used changes.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a pair of polarizing plates;
   a liquid crystal panel interposed between the pair of polarizing plates, the liquid crystal panel including a liquid crystal layer having liquid crystal molecules, the liquid crystal layer including a pair of regions corresponding to each of pixels, alignment directions of the liquid crystal molecules in the pair of regions being different by about 180 degrees from each other, the liquid crystal panel having a first slow axis;
   a first phase plate provided between the liquid crystal panel and one of the polarizing plates, the first phase plate having a second slow axis which is horizontal to a surface thereof and substantially perpendicular to the first slow axis of the liquid crystal panel; and
   a second phase plate provided between the liquid crystal panel and the one of the polarizing plates, the second phase plate having a third slow axis which is substantially perpendicular to both of the first slow axis of the liquid crystal panel and the second slow axis of the first phase plate,
   wherein the liquid crystal material has a dependency of birefringence anisotropy (Δn) from 20° C. to 60° C. ([Δn(20° C.)−Δn(60° C.)]/40) of 0.00026 or less.

2. A liquid crystal display device according to claim 1, wherein the second phase plate further has a fourth slow axis which is parallel to a surface thereof.

3. A liquid crystal display device according to claim 2, wherein the first slow axis of the liquid crystal panel is at an angle of about 45 degrees with respect to a polarizing axes of the polarizing plates when no electric field is applied to the liquid crystal panel.

4. A liquid crystal display device according to claim 2, wherein the liquid crystal material has a dependency of birefringence anisotropy (Δn) on the temperature from 20° C. to 60° C. ([Δn(20° C.)−Δn(60° C.)]/40) of 0.00014 or more.

5. A liquid crystal display device according to claim 2, wherein the liquid crystal material has a dependency of birefringence anisotropy (Δn) on the temperature from 20° C. to 60° C. ([Δn(20° C.)−Δn(60° C)]40) of 0.0002 or more.

6. A liquid crystal display device according to claim 2, further comprising:

a third phase plate having a fifth slow axis which is substantially perpendicular to the first slow axis of the liquid crystal panel and parallel to the second slow axis of the first phase plate; and
   a fourth phase plate having a sixth slow axis which is substantially perpendicular to both of the first slow axis of the liquid crystal and the fifth slow axis of the third phase plate,
   wherein the third phase plate is provided between the liquid crystal panel and the other polarizing plate so as to be symmetrical to the first phase plate with respect to the liquid crystal panel, and the fourth phase plate is provided between the liquid crystal panel and the other polarizing plate so as to be symmetrical to the second phase plate with respect to the liquid crystal panel.

7. A liquid crystal display device according to claim 6, wherein the first phase plate and the third phase plate have a substantially equal birefringence to each other, and the second phase plate and the fourth phase plate have a substantially equal birefringence to each other.

8. A liquid crystal display device according to claim 6, wherein the first slow axis of the liquid crystal panel is at an angle of about 45 degrees with respect to a polarizing axes of the polarizing plates when no electric field is applied to the liquid crystal panel.

9. A liquid crystal display device according to claim 6, wherein the liquid crystal material has a dependency of birefringence anisotropy ($\Delta n$) on the temperature from 20° C. to 60° C. ($[\Delta n(20° C.)-\Delta n(60° C.)]/40$) of 0.00014 or more.

10. A liquid crystal display device according to claim 6, wherein the liquid crystal material has a dependency of birefringence anisotropy ($\Delta n$) on the temperature from 20° C. to 60° C. ($[\Delta n(20° C.)-\Delta n(60° C.)]/40$) of 0.0002 or more.

11. A liquid crystal display device according to claim 1, further comprising:
   a third phase plate having a fifth slow axis which is substantially perpendicular to the first slow axis of the liquid crystal panel and parallel to the second slow axis of the first phase plate; and
   a fourth phase plate having a sixth slow axis which is substantially perpendicular to both of the first slow axis of the liquid crystal and the fifth slow axis of the third phase plate,
   wherein the third phase plate is provided between the liquid crystal panel and the other polarizing plate so as to be symmetrical to the first phase plate with respect to the liquid crystal panel, and the fourth phase plate is provided between the liquid crystal panel and the other polarizing plate so as to be symmetrical to the second phase plate with respect to the liquid crystal panel.

12. A liquid crystal display device according to claim 1, wherein the first slow axis of the liquid crystal panel is at an angle of about 45 degrees with respect to a polarizing axes of the polarizing plates when no electric field is applied to the liquid crystal panel.

13. A liquid crystal display device according to claim 1, wherein the liquid crystal material has a dependency of birefringence anisotropy ($\Delta n$) on the temperature from 20° C. to 60° C. ($[\Delta n(20° C.)-\Delta n(60° C.)]/40$) of 0.00014 or more.

14. A liquid crystal display device according to claim 1, wherein the liquid crystal material has a dependency of birefringence anisotropy ($\Delta n$) on the temperature from 20° C. to 60° C. ($[\Delta n(20° C.)=\Delta n(60° C.)]/40$) of 0.0002 or more.

* * * * *